US008619314B2

(12) United States Patent
Bannai

(10) Patent No.: US 8,619,314 B2
(45) Date of Patent: Dec. 31, 2013

(54) IMAGE PROCESSING APPARATUS FOR EXTRACTING AN IMAGE OF A DOCUMENT AREA AND METHOD OF CONTROLLING SAME

(75) Inventor: Nobuyuki Bannai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 541 days.

(21) Appl. No.: 11/950,906

(22) Filed: Dec. 5, 2007

(65) Prior Publication Data

US 2008/0137157 A1 Jun. 12, 2008

(30) Foreign Application Priority Data

Dec. 11, 2006 (JP) .................................. 2006-333867

(51) Int. Cl.
*G06K 15/00* (2006.01)
(52) U.S. Cl.
USPC .......... 358/1.18; 358/2.1; 358/1.12; 358/474; 358/497; 358/449
(58) Field of Classification Search
USPC ......... 358/497, 474, 449, 463, 1.12, 2.1, 1.18
See application file for complete search history.

(56) References Cited

U.S. PATENT DOCUMENTS

| | | | | | |
|---|---|---|---|---|---|
| 4,899,227 | A | * | 2/1990 | Yamada | 358/452 |
| 5,086,486 | A | * | 2/1992 | Yamada | 382/291 |
| 5,154,710 | A | * | 10/1992 | Williams | 604/301 |
| 5,260,804 | A | * | 11/1993 | Fukutomi et al. | 358/444 |
| 5,754,710 | A | * | 5/1998 | Sekine et al. | 382/300 |
| 6,005,683 | A | * | 12/1999 | Son et al. | 358/488 |
| 6,164,740 | A | | 12/2000 | Hirai et al. | 347/3 |
| 6,687,024 | B1 | * | 2/2004 | Short et al. | 358/474 |
| 2003/0198398 | A1 | * | 10/2003 | Guan et al. | 382/255 |
| 2007/0121136 | A1 | * | 5/2007 | Gotoh et al. | 358/1.9 |

FOREIGN PATENT DOCUMENTS

| | | |
|---|---|---|
| JP | 10-224563 | 8/1998 |
| JP | 11-341230 | 12/1999 |
| JP | 2002366942 A | 12/2002 |
| JP | 2003-134322 | 5/2003 |
| JP | 2004208334 A | 7/2004 |
| JP | 2003-60872 | 9/2004 |
| JP | 2005039485 A | 2/2005 |
| JP | 2005-252490 | 9/2005 |

* cited by examiner

*Primary Examiner* — King Poon
*Assistant Examiner* — Jamares Q Washington
(74) *Attorney, Agent, or Firm* — Fitzpatrick, Cella, Harper & Scinto

(57) ABSTRACT

Provided is a technique that makes it possible to extract the image of a document area from a read image with better accuracy. An image processing apparatus capable of achieving this includes a reading unit for reading a document, which has been placed on a contact glass, as read image data; a first area determination unit for deciding a provisional document area by subjecting the read image data to detection processing for detecting a document area included in the read image data; and a second area determination unit for deciding a fixed document area by generating binary image data in an area corresponding to the provisional document area of the read image data, and executing detection processing for detecting a document area, which is included in the read image data, based upon the binary image data.

8 Claims, 17 Drawing Sheets

FIG. 5
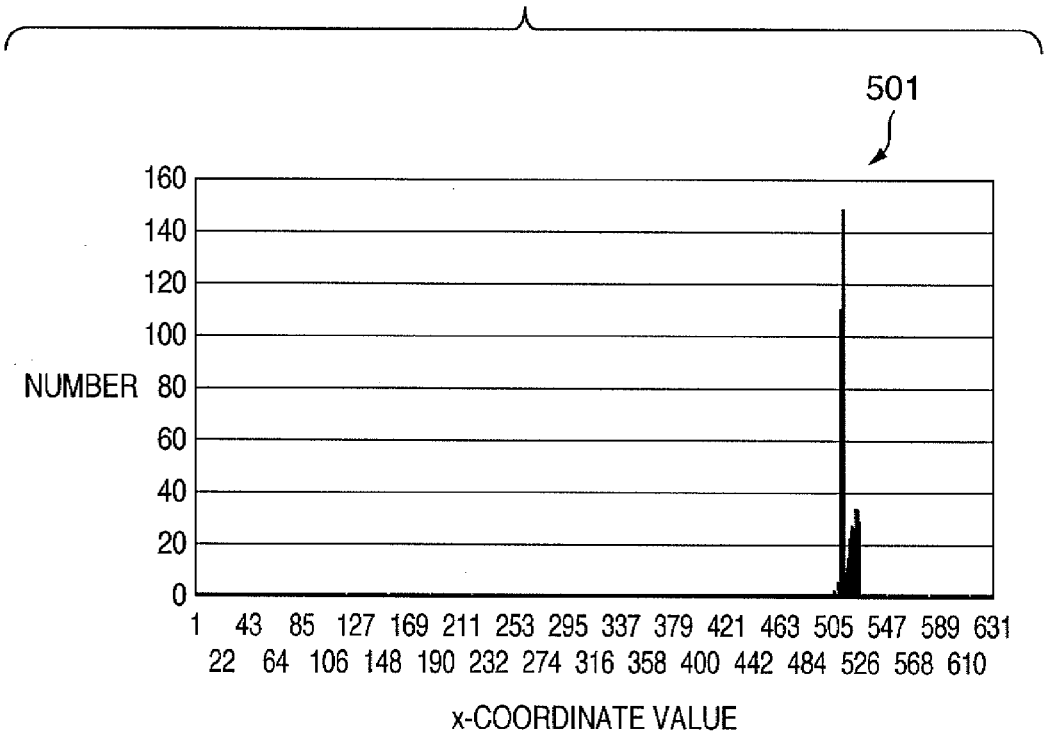
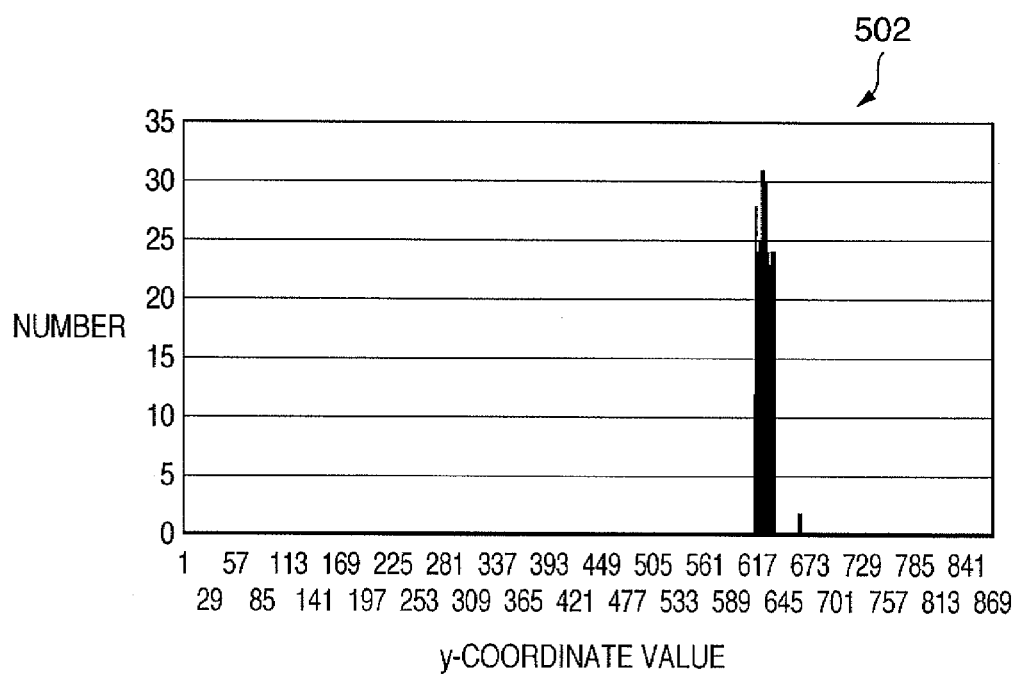

FIG. 6
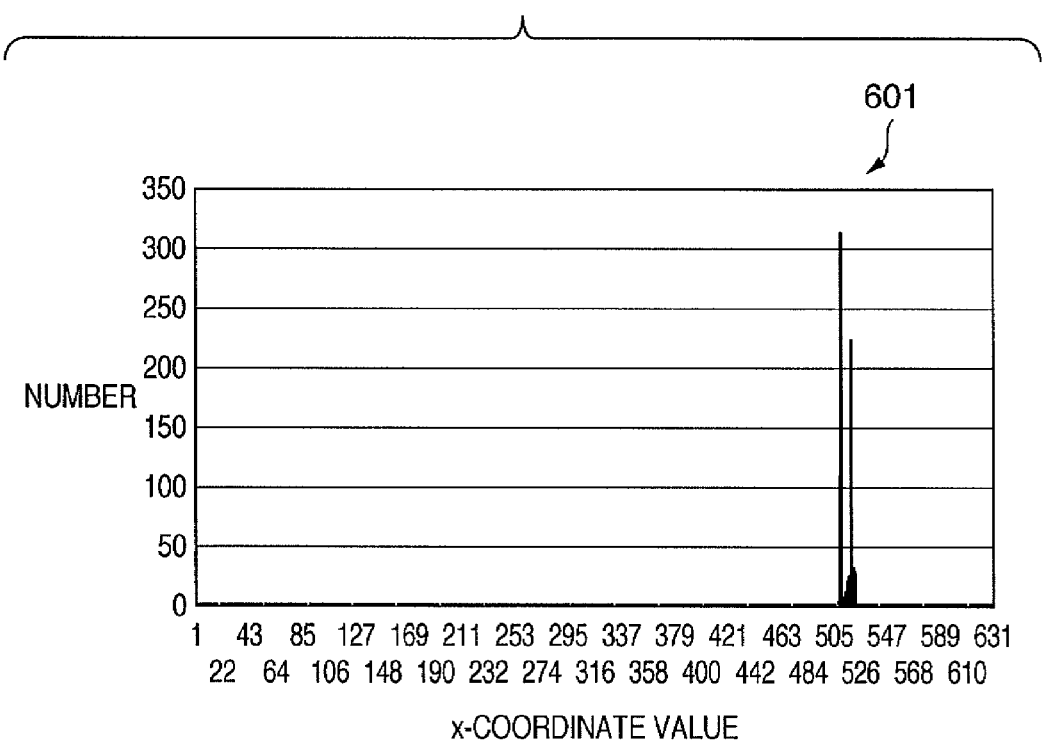
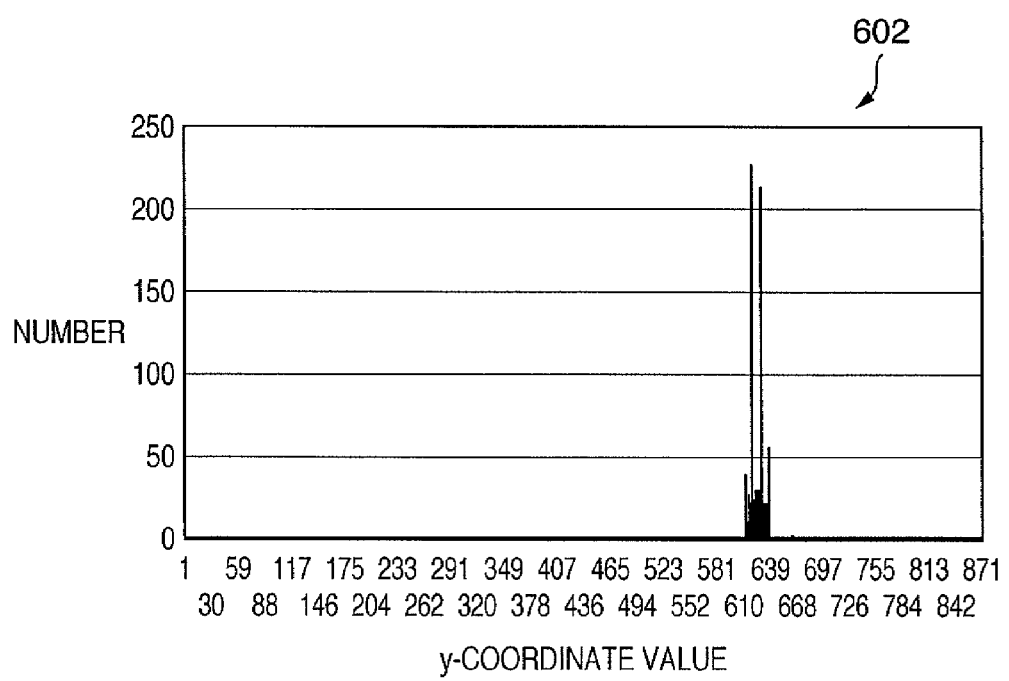

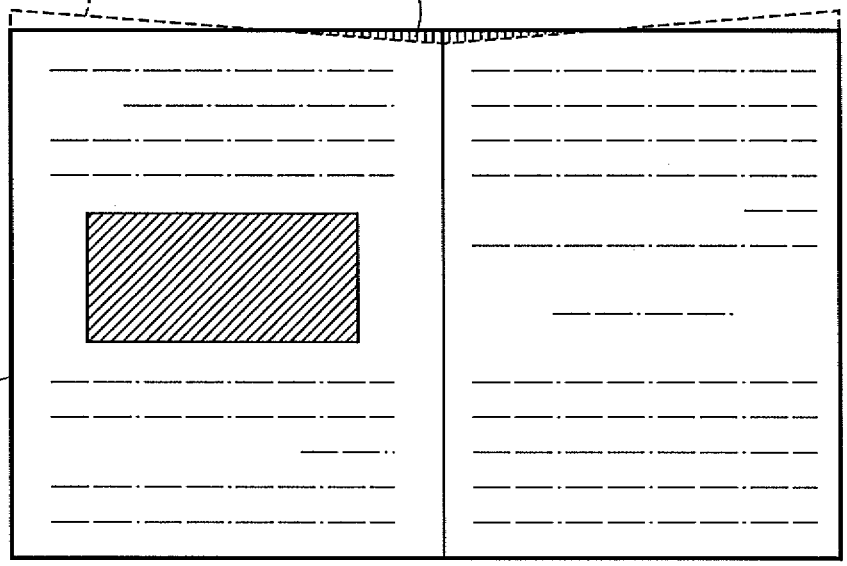

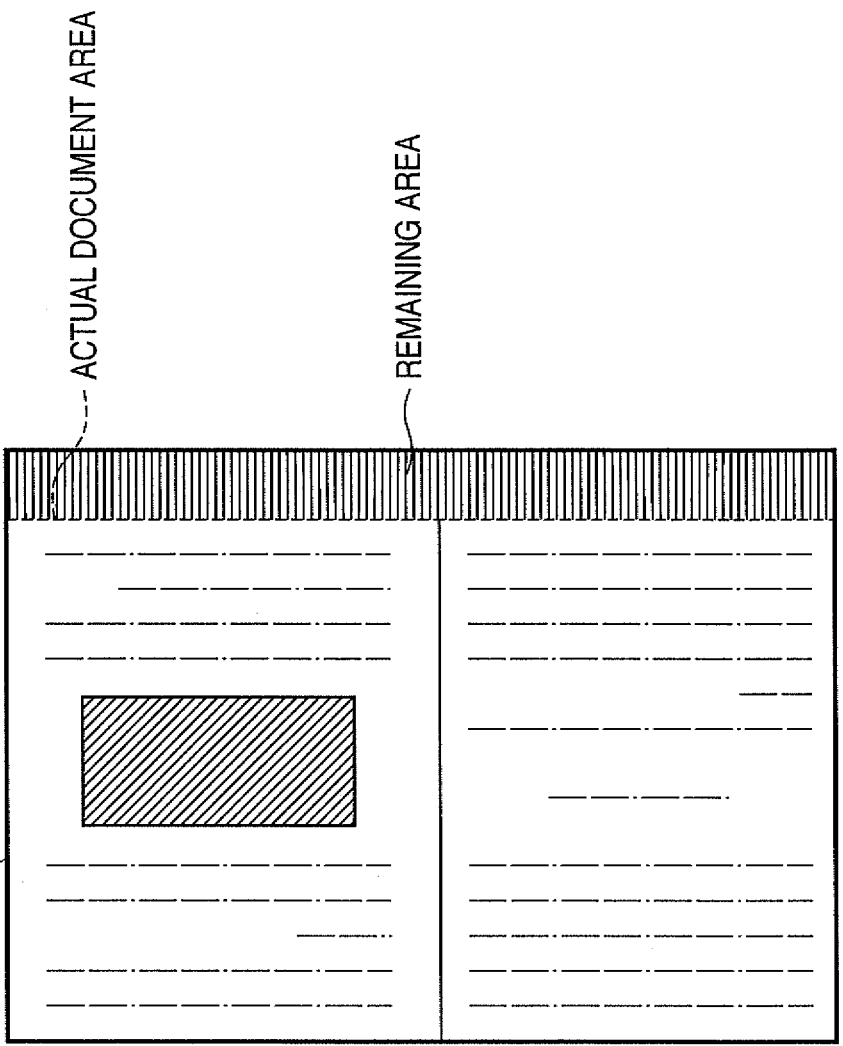

F I G. 12
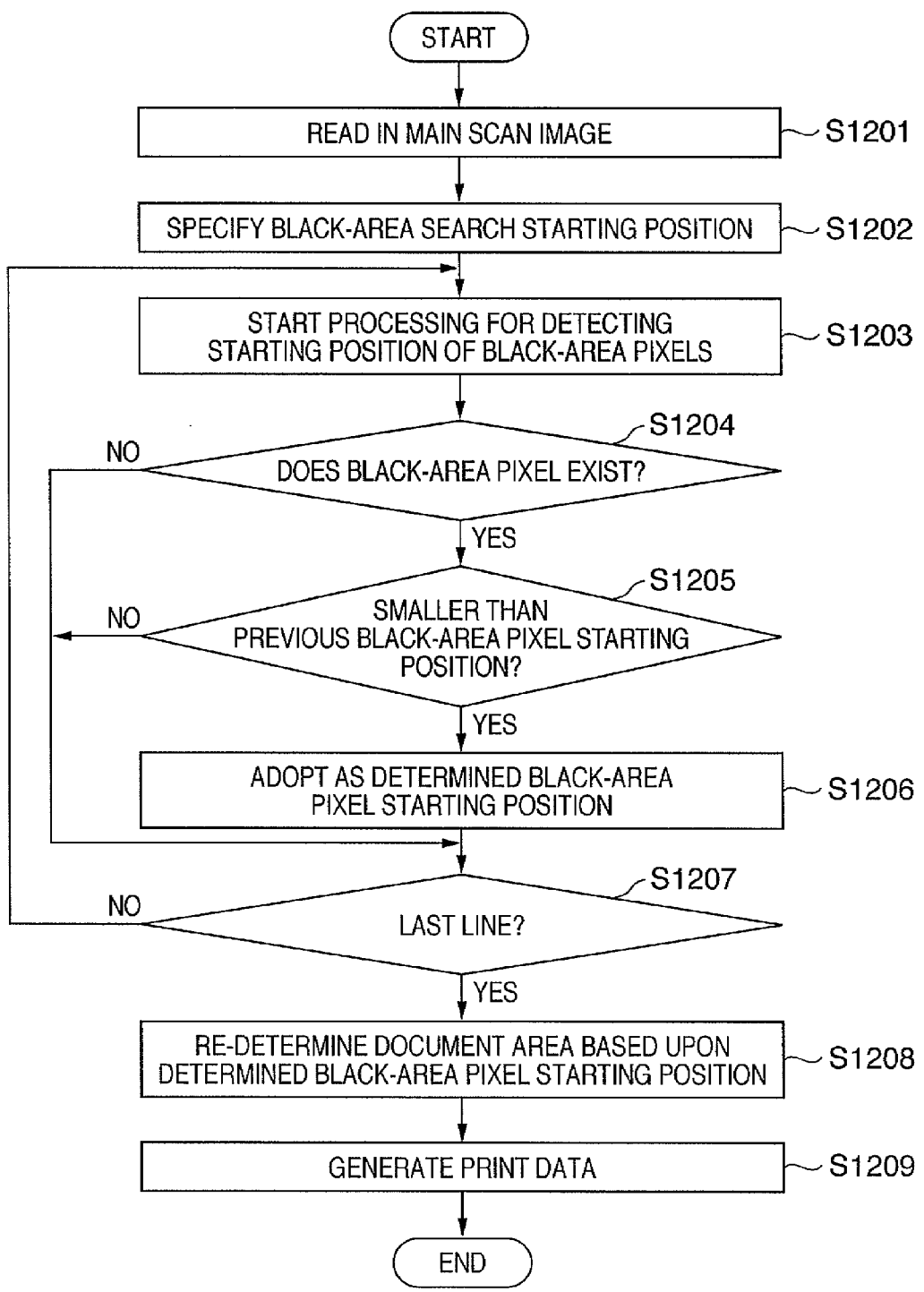

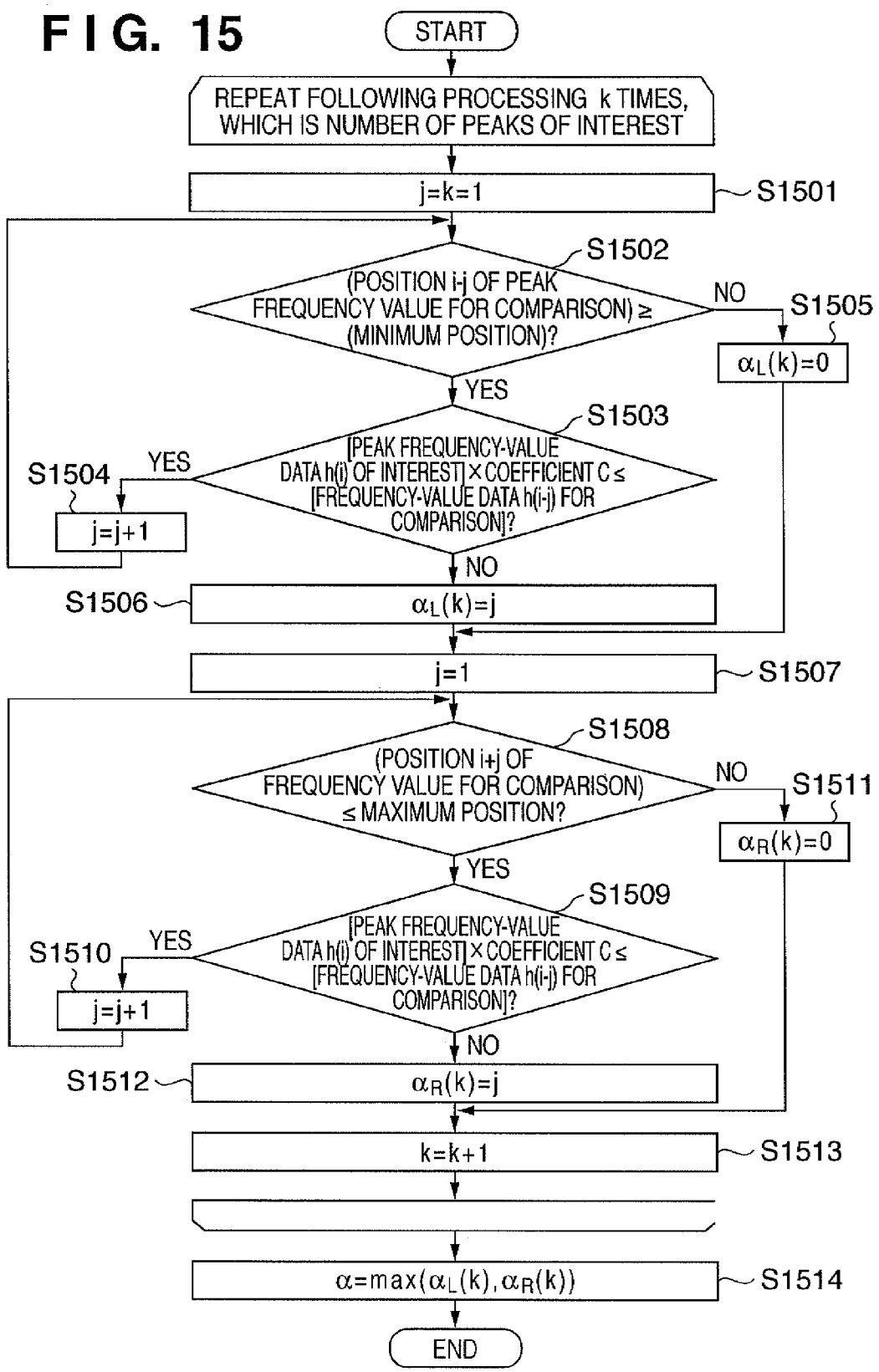

IMAGE PROCESSING APPARATUS FOR EXTRACTING AN IMAGE OF A DOCUMENT AREA AND METHOD OF CONTROLLING SAME

BACKGROUND OF THE INVENTION

1. Field of the Invention

The present invention relates to an image processing technique for detecting and extracting a document area from a read image.

2. Description of the Related Art

An algorithm for extracting a rectangular area from a read image (original image) read by a scanner or the like in a conventional image processing apparatus has been proposed, as described in the specification of Japanese Patent Laid-Open No. 10-224563 (Patent Document 1). Further, in the case of an document having thickness, such as a book, an area of black pixels is produced surrounding the document in the read image because the document cover cannot be closed completely. The specifications of Japanese Patent Laid-Open Nos. 11-341230 (Patent Document 2), 2003-60872 (Patent Document 3), 2003-134322 (Patent Document 4) and 2005-252490 (Patent Document 5) propose techniques for detecting a document area based upon the area of black pixels and replacing the area of black pixels outside the document area with white pixels in order to avoid the wasteful consumption of toner or ink.

However, these conventional techniques involve certain problems. For example, with the image processing apparatus described in Patent Document 1, two different document edge sensing means are used. Detection of document size is performed by adopting the larger of two document edge positions, which have been sensed by respective ones of the document edge sensing means, as the document edge. A problem which arises is the high likelihood that the document size sensed as a result will be too large. Further, with the image processing apparatus described in Patent Document 2, the fact that a document to be read is a thick document such as a book is specified in advance. In other words, it is required that the user be aware of whether the document cover is open or closed.

With the image processing apparatus described in Patent Documents 3 and 4, either a document cover sensor is provided or the open-state of a document cover is detected by a brightness value acquired by a mounted reading sensor. Based upon the result of detection, processing is changed over or scanning is performed without placement of a document on the contact glass. In other words, a special sensor such as a document cover sensor is required. The problem that arises is an increase in cost. Further, in a case where the apparatus is equipped with a CCD-type reading sensor, the characteristic of the sensor is such that the reading depth is large. Consequently, if there is illumination such as a fluorescent lamp above the apparatus with the document cover open, the image data will clearly include the shape of the illumination. In order to eliminate this influence, scanning must be performed in the absence of a document and a complicated operation is required.

Furthermore, with the image processing apparatus described in Patent Document 5, a document area is detected based upon the state of continuous black pixels and white pixels in a case where a document is copied to paper of a size larger than the document size with the document cover left open. In this case, if the document cover is not left fully open, the density of a black area produced surrounding the document will not be uniform. As a result, depending upon the particular case, continuous pixels of a stipulated density cannot be detected and black pixels outside the document area are printed line by line.

SUMMARY OF THE INVENTION

The present invention has been devised in view of the foregoing problems and its object is to provide a technique that makes it possible to extract the image of a document area with better accuracy while solving one or more of the foregoing problems.

According to one aspect of the present invention, an image processing apparatus comprises: a reading unit for reading a document, which has been placed on a contact glass, as read image data; a first area determination unit for deciding a provisional document area by subjecting the read image data, which has been read by the reading unit, to detection processing for detecting a document area included in the read image data based upon at least one of a brightness value and color difference value of each pixel constituting the read image data; and a second area determination unit for deciding a fixed document area by generating binary image data that is based upon at least one among brightness, color difference and an edge detection filter in an area corresponding to the provisional document area of the read image data read by the reading unit, and executing detection processing for detecting a document area, which is included in the read image data, based upon the binary image data.

According to another aspect of the present invention, an image processing apparatus comprises; a reading unit for generating read image data by successively reading a document, which has been placed on a contact glass, in a first direction, which is a main-scan direction, and in a second direction, which is a sub-scan direction that forms a right angle with the first direction, with a document-placement reference point provided on the contact glass serving as a reference; and an area determination unit for subjecting the read image data generated by the reading unit to edge detection processing, which is for detecting an edge of the document area, in directions corresponding to the main- and sub-scan directions of the read image data, based upon at least one of a brightness value and color difference value of each pixel constituting the read image data, and deciding the document area based upon a most frequently detected edge value.

According to still another aspect of the present invention, a method of controlling an image processing apparatus, comprises: a reading step of reading a document, which has been placed on a contact glass, as read image data; a first area determination step of deciding a provisional document area by subjecting the read image data, which has been read by the reading unit, to detection processing for detecting a document area included in the read image data based upon at least one of a brightness value and color difference value of each pixel constituting the read image data; and a second area determination step of deciding a fixed document area by generating binary image data that is based upon at least one among brightness, color difference and an edge detection filter in an area corresponding to the provisional document area of the read image data read at the reading step, and executing detection processing for detecting a document area, which is included in the read image data, based upon the binary image data.

In accordance with the present invention, a technique that makes it possible to extract the image of a document area from a read image with better accuracy can be provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram illustrating an example of histograms produced at step S303;

FIG. 6 is a diagram illustrating an example of histograms manipulated at a step S304;

FIGS. 9A and 9B are diagrams exemplifying the results of extracting a document area from a prescan image based upon a second document area;

FIG. 12 is a flowchart of operation executed when removing a residual black-pixel area in a main-scan image;

FIG. 15 is a flowchart of processing executed when the value of $\alpha$ is set automatically.

DESCRIPTION OF THE EMBODIMENTS

Preferred embodiments of the present invention will now be described in detail with reference to the drawings. It should be noted that these embodiments are for illustrative purposes only and that the scope of the invention is not limited to these embodiments.

(First Embodiment)

An image processing apparatus having a reading unit will be described as an example of a first embodiment of an image processing apparatus according to the present invention.

<Structure of Apparatus>

Figure 1:
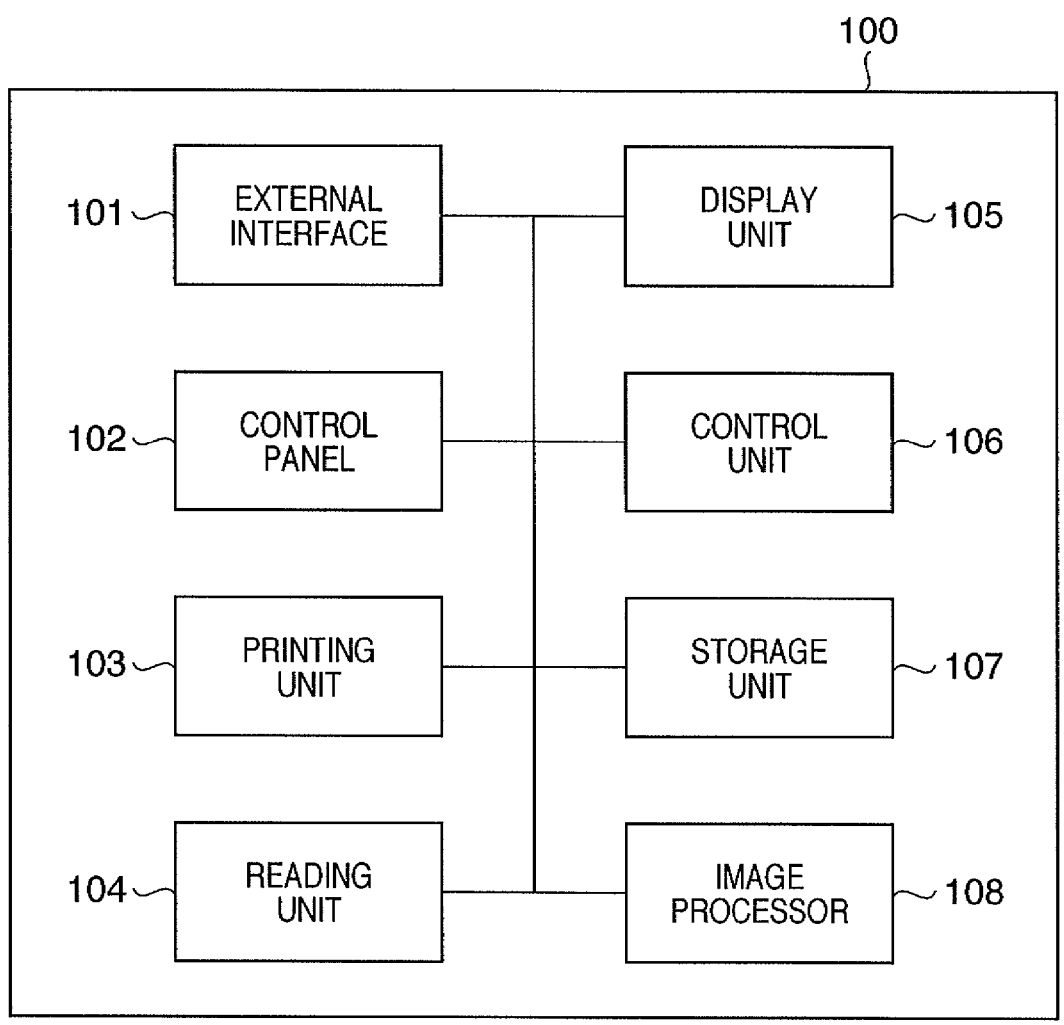
FIG. 1 is a block diagram illustrating an image processing apparatus according to a first embodiment of the present invention.

FIG. 1 is a block diagram illustrating the image processing apparatus 100 according to the first embodiment.

An external interface 101 is for inputting image data, etc., which has been captured as by a digital camera, to the image processing apparatus 100. The interface usually is implemented by a slot for various memory cards or by a USB connector for connecting a digital camera or personal computer, etc. Here it is assumed that a PC card (PCMCIA) slot has been provided as a physical receptacle for a memory card. It should be noted that an IrDA (infrared communication) receiver or the like may be adopted as a contactless interface. A control panel 102 is a functional unit that allows a user to perform operations and make various settings, etc. A printing unit 103 is constituted by an inkjet-printer, by way of example. Here it is assumed that data from a memory card that has been connected to the external interface 101 or image data read by a reading unit 104 is printed.

The reading unit 104 is a CCD- or CIS-type color scanner for reading a silver-chloride photograph or magazine as image data (digital data). A display unit 105 is a functional unit for presenting the user with image data that has been read in, apparatus status information and input information provided by the control panel 102. A control unit 106 is a functional unit for controlling the components of the image processing apparatus 100. By way of example, the control unit 106 controls the components based upon image processing by an image processor 108 (described later) and acquires the status of the apparatus using various sensors. A storage unit 107 stores image data that has been input via the external interface 101 or reading unit 104. The storage unit 107 stores programs and data for implementing various control means described later. When necessary, the storage unit 107 is used as a work area and an area for registering various setting items in order to execute control. The image processor 108 executes processing for detecting a document area from original image data, described later, and executes processing for generating print data for printing from image data.

<Operation of Apparatus>

Figure 2:
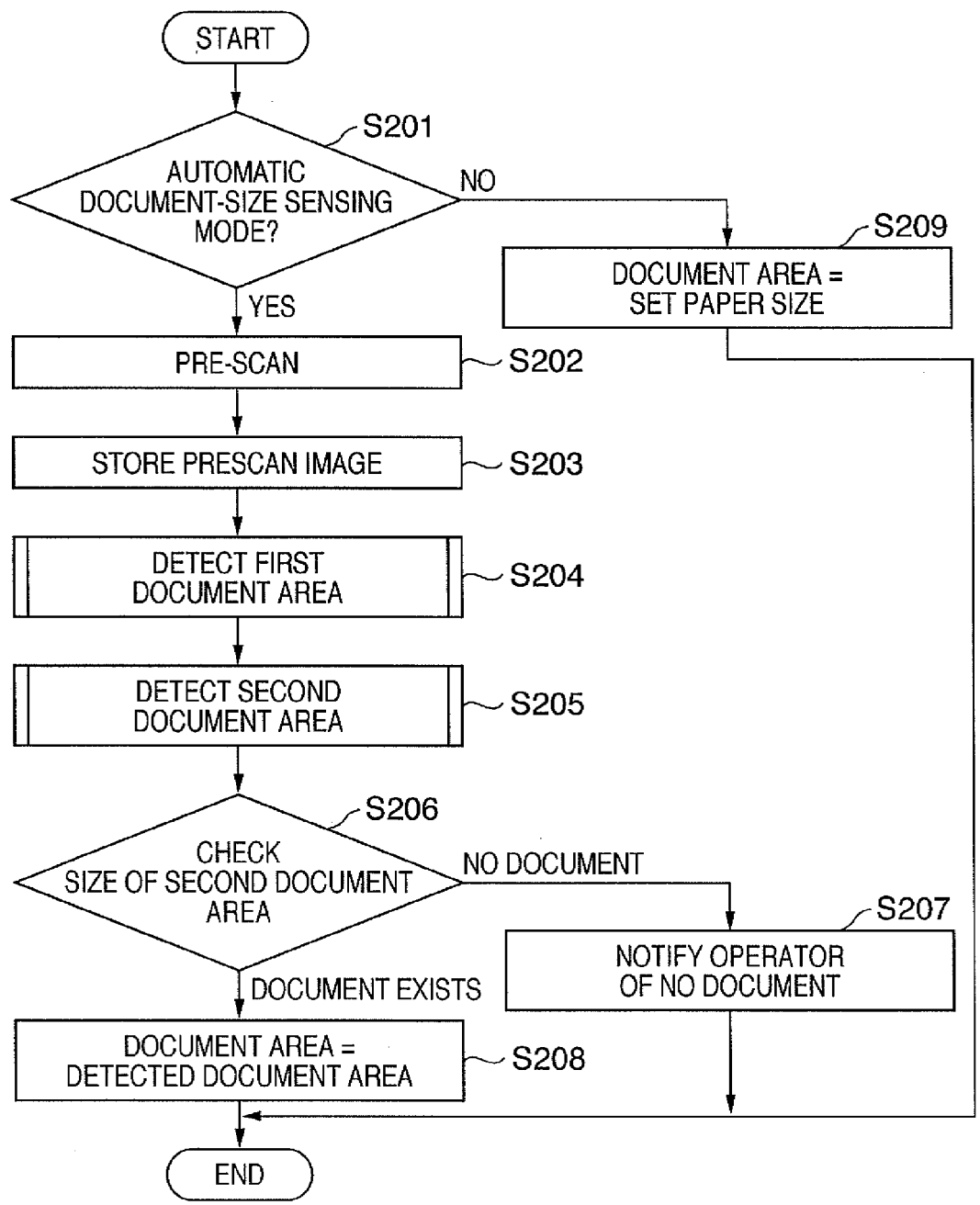
FIG. 2 is a flowchart of processing for detecting a document area in the image processing apparatus according to the first embodiment.

FIG. 2 is a flowchart of processing for detecting a document area in the image processing apparatus according to the first embodiment. A document placed on the contact glass of the reading unit 104 is read. In order to simplify the description, it is assumed that the enlargement ratio that has been set in the reading unit 104 is 100%. Further, it is assumed that the document has been placed on the contact glass in abutment with a contact-glass abutment position (reference point), as exemplified in FIG. 4. Each of the steps described below is implemented by the control unit 106 controlling each of the components.

At step S201, the control unit 106 determines whether the image processing apparatus 100 has been set to an automatic document-size sensing mode. That is, the control unit 106 determines whether the automatic document-size sensing mode has been set in the storage unit 107 by the user via the control panel 102. In a case where it is determined that the automatic document-size sensing mode has not been set, control proceeds to step S209. Here the control unit 106 construes that the document area is the paper size that has been set in the image processing apparatus 100 and terminates this processing flow. On the other hand, if it is determined that the automatic document-size sensing mode has been set, then control proceeds to step S202.

At step S202, prescanning is performed by the reading unit 104 and image data is acquired. Here prescanning signifies reading image data at a resolution lower than usual in order to fix the document area and alleviate the load of analytical processing. With prescanning, for example, the entire surface of the contact glass is read in RGB color at a reading resolution of 75 dpi, $\gamma=1.0$ (linear data).

At step S203, the image data read at step S202 is stored in the storage unit 107.

At step S204, first document area detection processing is applied by the image processor 108 to the image data stored at step S203, whereby a first document area is decided. The details of first document area detection processing will be described later with reference to FIG. 3.

At step S205, second document area detection processing is applied by the image processor 108 to the image data stored at step S203, whereby a second document area is decided. The details of second document area detection processing will be described later with reference to FIG. 8.

At step S206, the size of the second document area decided at step S205 is checked by the image processor 108. If the size of the second document area is a minimum-detected document size stipulated beforehand for this image processing apparatus, i.e., less than 1 inch×1 inch, the decision rendered is absence of a document and control proceeds to step S207. On the other hand, if the size of the second document area is larger than the second document area is a minimum-detected document size stipulated beforehand for this image processing apparatus, control proceeds to step S208.

At step S207, absence of a document is displayed by the display unit 105 and processing is exited. As a result, the operator can tell that a document has not been placed.

At step S208, it is construed that the second document area decided at step S205 is the document area and this processing flow is terminated.

<Details of First Document Area Detection Processing (Step S204)>

Figure 3:
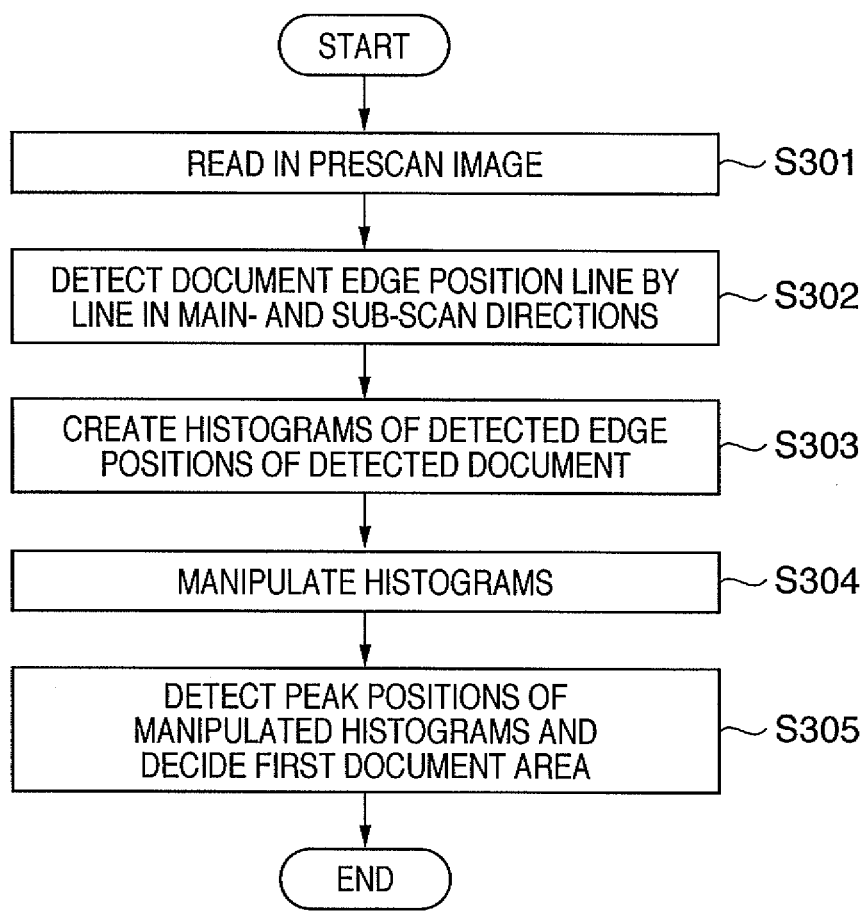
FIG. 3 is a detailed flowchart of first document area detection processing (step S204)

FIG. 3 is a detailed flowchart of first document area detection processing (step S204). It should be noted that the first document area detection processing is processing particularly suited to document area detection in a state in which the document cover is open.

Figure 4:
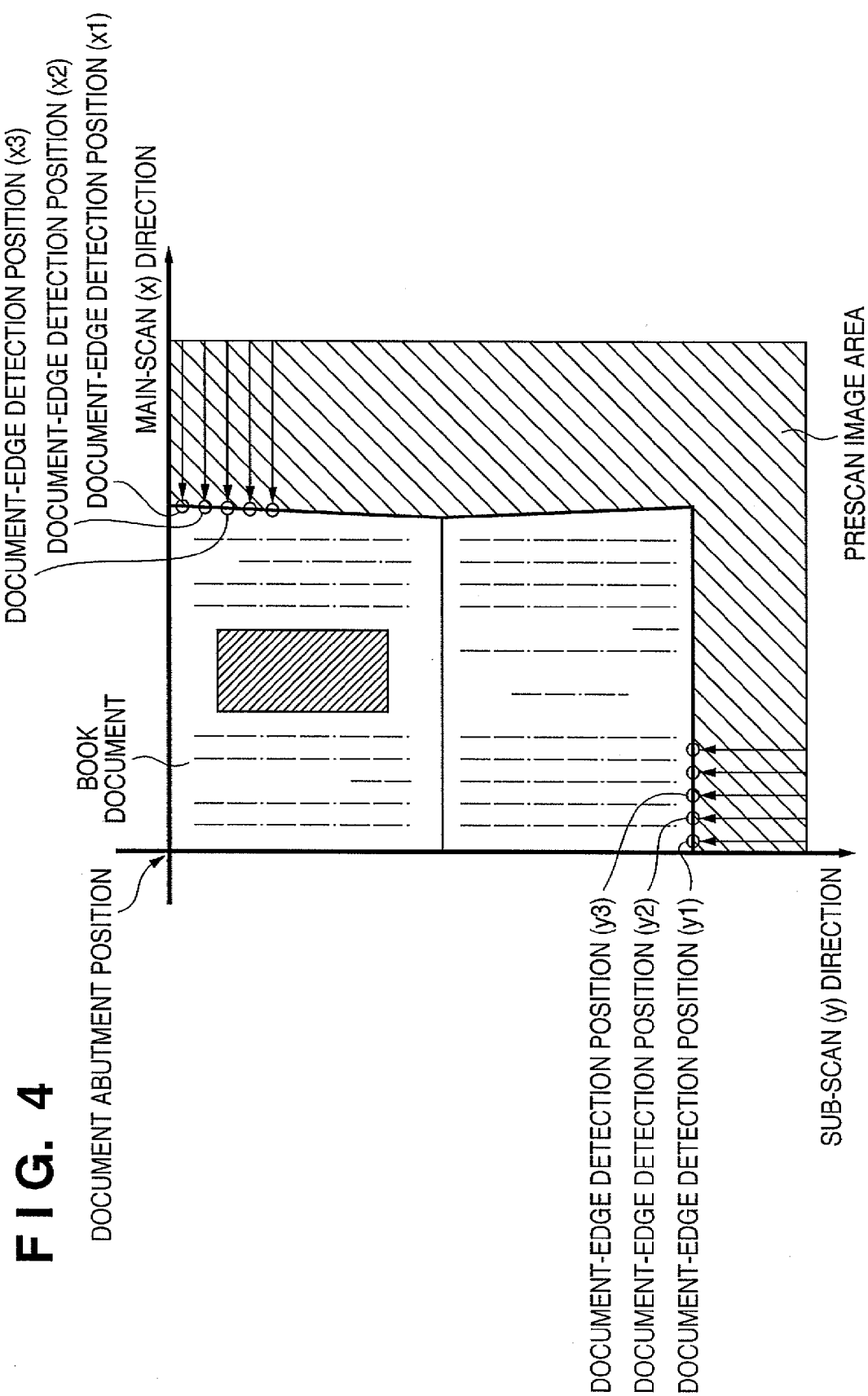
FIG. 4 is a schematic view of image data obtained by prescanning a book in a state in which the document cover of a reader is open.

FIG. 4 is a schematic view of image data obtained by prescanning a book in a state in which the document cover of the reading unit is open. Here an xy coordinate system has been constructed with the upper-left corner of the prescan data serving as the document abutment position (origin). As illustrated in FIG. 4, the area surrounding the document is a black-pixel area with the document cover in the open state. Specifically, a black-pixel area exists in an area in which the x, y coordinate values are large.

The prescan image that has been stored in the storage unit 107 is read in at step S301.

Next, at step S302, document edge positions xi and yi (where i is a positive number) are detected line by line in the main-scan (x) direction and sub-scan (y) direction, respectively, with regard to the prescan image read in at step S301.

By way of example, a method utilizing a fluctuation in brightness value is available as a method of detecting document edge position. Specifically, an edge is detected on the condition that the brightness value of a pixel at a certain coordinate position is greater than a threshold value $T_{lum1}$ or the condition that color difference is greater than a threshold value $T_{sat1}$. A luminance value $L(x,y)$ and a color difference $S(x,y)$ with regard to a pixel having a pixel value $[R(x,y), G(x,y), B(x,y)]$ at a certain coordinate position $(x,y)$ can be obtained by the following equations:

$$L(x,y)=0.3*R(x,y)+0.59*G(x,y)+0.11*B(x,y) \quad \text{(Eq. 1)}$$

$$S(x,y)=\max[R(x,y), G(x,y), B(x,y)]-\min[R(x,y), G(x,y), B(x,y)] \quad \text{(Eq. 2)}$$

Here $\max[R(x,y), G(x,y), B(x,y)]$ and $\min[R(x,y), G(x,y), B(x,y)]$ represent the maximum and minimum values, respectively, of $R(x,y), G(x,y), B(x,y)$, respectively.

At step S303, histograms relating to the respective document edge coordinates x, y detected at step S302 are created. When the histograms are generated, data for which the detected document edge coordinate position is less than the minimum detected document size need not be used. FIG. 5 is a diagram illustrating an example of histograms produced at step S303. The histograms generated are a histogram 501 in the main-scan (x) direction and a histogram 502 in the sub-scan (y) direction.

The histograms generated at step S303 are manipulated at step S304. An example of a method of manipulation is processing whereby frequency values within a range of a on either side of the detected edge position of a document are consolidated as a single value. FIG. 6 is a diagram illustrating an example of histograms manipulated at a step S304. Reference numerals 601 and 602 denote histograms that have been manipulated in the main-scan (x) direction and sub-scan (y) direction, respectively. Such manipulation is particularly effective in a case where a document area is so deformed that document edge position cannot be uniquely determined, as is the case with the right-hand edge of the prescan image shown in FIG. 4.

It should be noted that the value of α is a value that is set beforehand for every apparatus configuration. Alternatively, the value is set automatically by analyzing the histogram, as will be described later.

Figure 14:
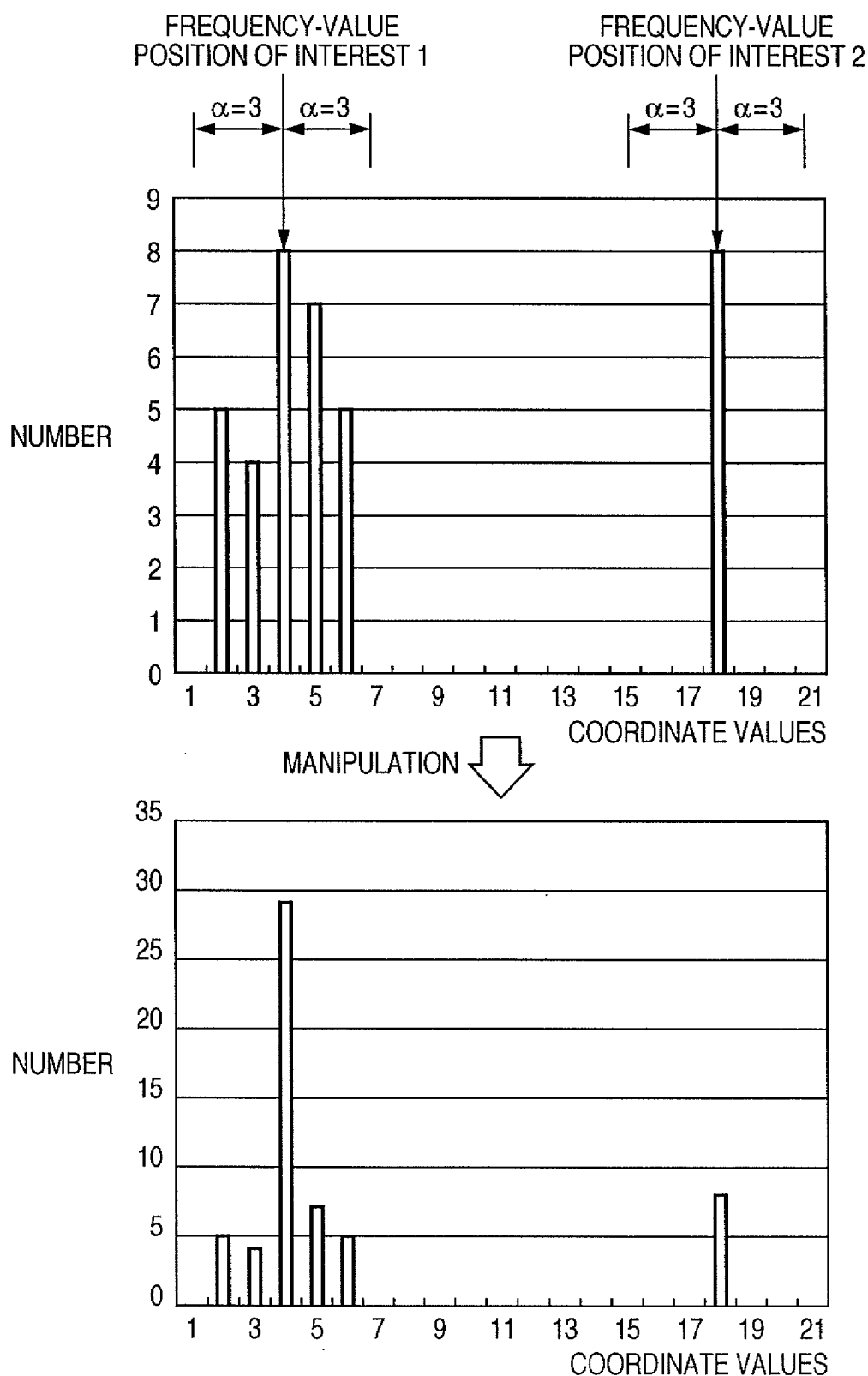
FIG. 14 is a diagram illustrating an example of a histogram manipulated by setting the value of $\alpha$ to 3.

FIG. 14 is a diagram illustrating an example of histograms before manipulation (top) and after manipulation (bottom) in a case where the value of a has been set to 3 beforehand.

The histogram before manipulation at the top of FIG. 14 has two peaks of the same frequency value (frequency-value positions of interest 1 and 2). In a case where a plurality of peaks thus exist, it is difficult to simply decide which peak should be selected. However, when a document edge position is detected, frequency values on either side of the peak position to be selected have a certain magnitude in most cases. By utilizing this feature of document edge position detection and adding frequency values in the range of peak position ±α(=3) to the frequency value of the frequency-value position of interest, it is possible to readily find the peak position to be selected. The value found by this method is set before hand as a.

Alternatively, by analyzing the histogram, the feature of document edge position detection is detected and the value of α is set automatically.

FIG. 15 is a flowchart of processing executed when the value of α is set automatically by analyzing a histogram.

First, a value on the left side of the peak frequency value of interest, namely a portion having smaller coordinate values, is found. At step S1501, each value is initialized. Here j represents a position parameter for finding the value of α, and k represents a counter for counting the number of iterations.

With respect to position i of the peak frequency value of interest, it is determined at step S1502 whether a position i–j of a frequency value for comparison is equal to or greater than a minimum position. If the position i–j of the frequency value for comparison is smaller than the minimum position, then frequency-value data h(i–j) does not exist at this position. Control therefore proceeds to step S1505, 0 is adopted as the α value candidate and is stored as $α_L(k)$. Control then proceeds to step S1507. If the position i–j of the frequency value for comparison is equal to or greater than the minimum position, i.e., if the frequency-value data h(i–j) for comparison exists, then control proceeds to step S1503.

At step S1503, it is determined whether the frequency-value data h(i–j) for comparison is data greater, by a fixed ratio, than the peak frequency-value data h(i) of interest. For example, a coefficient C=0.7 is set beforehand and it is determined whether the frequency-value data h(i–j) for comparison is data that is more than 70% greater than the peak frequency-value data h(i) of interest. If this condition is satisfied, control proceeds to step S1504 and the position parameter j for finding the a value is incremented. If this condition is not satisfied, control proceeds to step S1505, j is adopted as the α value candidate and is stored as $\alpha_L(k)$. Control then proceeds to step S1507.

Next, a value on the right side of the peak frequency value of interest, namely a portion having larger coordinate values, is found. At step S1507, the position parameter j for finding the a value is initialized to 1 again.

With respect to position i of the peak frequency value of interest, it is determined at step S1508 whether α position i+j of a frequency value for comparison is equal to or less than a maximum position. If the position i+j of the frequency value for comparison is greater than the minimum position, then frequency-value data h(i+j) does not exist at this position. Control therefore proceeds to step S1511, 0 is adopted as the α value candidate and is stored as $\alpha_R(k)$. Control then proceeds to step S1513. If the position i+j of the frequency value for comparison is smaller than the minimum position, i.e., if the frequency-value data h(i+j) for comparison exists, then control proceeds to step S1509.

At step S1509, it is determined whether the frequency-value data h(i+j) for comparison is data greater, by a fixed ratio, than the peak frequency-value data h(i) of interest. In a manner similar to that described earlier, coefficient C is set to, e.g., 0.7 beforehand and it is determined whether the frequency-value data h(i+j) for comparison is data that is more than 70% greater than the peak frequency-value data h(i) of interest. If this condition is satisfied, control proceeds to step S1510 and the position parameter j for finding the α value is incremented. If this condition is not satisfied, control proceeds to step S1512, j is adopted as the α value candidate and is stored as $\alpha_R(k)$. Control then proceeds to step S1513.

At step S1513, the iteration counter k is incremented and processing is repeated the number of times it should be repeated. After such processing, control proceeds to step S1514.

At step S1514, the largest among all α candidate values $\alpha_L(k)$ and $\alpha_R(k)$ found thus far is selected and this is set as the a value. The above-described processing is repeated a number of times equivalent to the number of peaks of interest.

As described above, by utilizing the fact that values in the vicinity of a peak frequency value to be selected are values close to the peak frequency value, which is a feature of this document area extraction, the α value is set automatically, thereby making it possible to perform a more suitable histogram manipulation. It goes without saying that the preset coefficient C is not limited to 0.7.

At step S305, the peak positions in the x and y directions in the histograms manipulated at step S304 are detected and are decided on as the first document area. In other words, the first document area is decided based upon the position at which the frequency value takes on the largest value.

Figure 7:
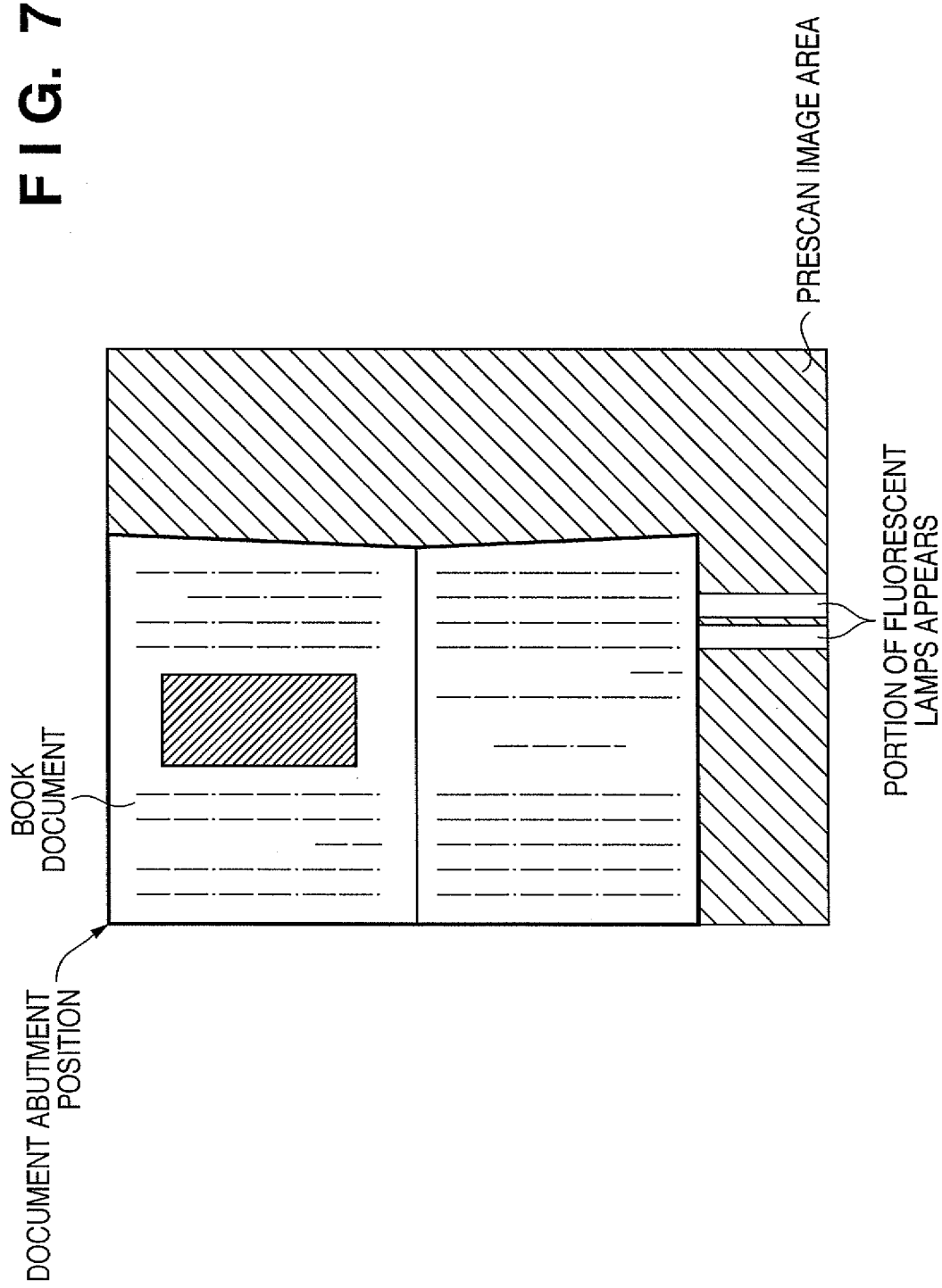
FIG. 7 is a diagram exemplifying image data in which part of a fluorescent lamp appears.

By utilizing the largest frequency value to decide the first document area in the manner described above, even if a portion of a fluorescent lamp appears in the image data, as illustrated in FIG. 7, it is possible to detect the document area without the influence of the fluorescent lamp. The reason for this is that in a case where the position of the edge of a document is detected line by line at step S302, generally the frequency of correct detection of the document edge position is greater in comparison with the frequency with which the appearance of the fluorescent lamp is detected erroneously as the document edge position.

<Details of Second Document Area Detection Processing (Step S205)>

Figure 8:
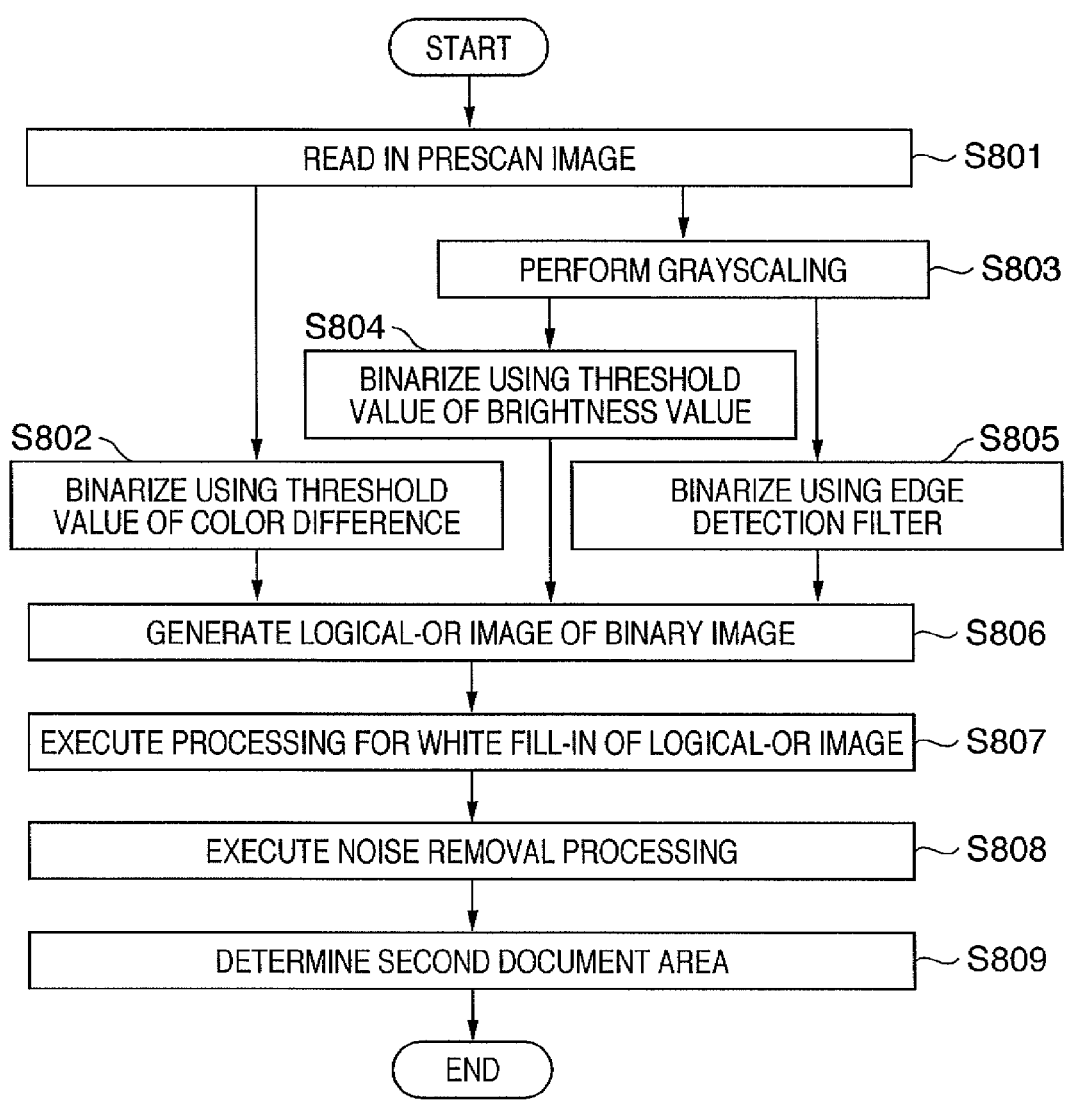
FIG. 8 is a detailed flowchart of second document area detection processing (step S205)

FIG. 8 is a detailed flowchart of second document area detection processing (step S205). It should be noted that the second document area detection processing is processing particularly suited to document area detection in a state in which the document cover is closed.

The prescan image that has been stored in the storage unit 107 is read in at step S801.

At step S802, the color difference is calculated for each pixel of the prescan image read in at step S801 and binarization processing is executed using a threshold value $T_{sat2}$. In other words, the processing produces a binary image in which portions that exceed the threshold value $T_{sat2}$ are made "1" and other portions are made "0". Let $Img_{bw1}$ represent the binary image produced. It should be noted that color difference is calculated using Equation (2) cited above. The value of the threshold value $T_{sat2}$ is a value set beforehand for every apparatus configuration.

At step S803, a brightness value is calculated for each pixel of the prescan image that has been stored in the storage unit 107. It should be noted that the brightness value is calculated using Equation (1) cited above. In other words, grayscaling of the image data is performed at this step.

At step S804, the image data that has been grayscaled at step S803 is subjected to binarization processing using a threshold value $T_{lum2}$. In other words, this processing produces a binary image in which portions that exceed the threshold value $T_{lum2}$ are made "0" and other portions are made "1". Let $Img_{bw2}$ represent the binary image produced. The value of the threshold value $T_{lum2}$ is a value set beforehand for every apparatus configuration.

At step S805, the image data that has been grayscaled at step S802 is subjected to binarization processing using an edge detection filter. In other words, this processing produces a binary image in which portions detected as edges are made "1" and other portions are made "0". Let $Img_{bw3}$ represent the binary image produced.

A binary image $Img_{bw}$ is generated at step S806. Here $Img_{bw}$ is obtained by subjecting $Img_{bw1}$, $Img_{bw2}$, $Img_{bw3}$ to a logical OR operation (Equation 3 below) for every corresponding pixel thereof.

$$Img_{bw} = Img_{bw1} \cup Img_{bw2} \cup Img_{bw3} \qquad (Eq.\ 3)$$

Based upon the first document area that has been decided by the above-described processing for detecting the first document area, processing for white fill-in of the area outside the first document area is applied to the binary image $Img_{bw}$ obtained at step S806. Let $Img_{bw}'$ represent the binary image that has undergone white fill-in processing. By way of example, assume here that the first document area is a binary image Imgbw4 that has undergone white fill-in processing. In this case, $Img_{bw}'$ can be readily obtained by taking the logical AND between $Img_{bw}$ and $Img_{bw4}$.

At step S808, a label number is assigned to each black pixels of the binary image $Img_{bw}'$ generated at step S807. When a label number is assigned, identical label numbers are assigned adjoining black pixels. A histogram of numbers of pixels relating to assigned label numbers is generated, a pixel for which the assigned label number is less than a stipulated number of pixels is judged to be noise and this pixel is replaced by a white pixel, thereby generating a binary image $Img_{bw}''$.

At step S809, the document-abutment position and the coordinates of a black pixel farthest from the document-abutment position are acquired from the binary image $Img_{bw}''$ from which noise has been removed by the labeling processing of step S808. The rectangular area having these two acquired points as vertices is decided upon as a second document area.

<Effects of Combining Processing for Detecting the First Document Area and Processing for Detecting the Second Document Area>

If prescanning is executed with the document cover closed completely, a black area will not be produced around the document. Therefore, in a case where the above-described processing for detecting the first document area has been applied independently to the prescan image, the document area detected will be detected erroneously as the prescan image in its entirety.

Further, if prescanning is executed with the document cover open, a black area will be produced around the document. Therefore, in a case where the above-described processing for detecting the second document area has been applied independently to the prescan image, almost all of the binary image $\text{Img}_{bw}$ will be occupied by a black-pixel area. In other words, the entirety of the prescan image is detected erroneous as the second document area.

However, by using the decided first document area in the white fill-in processing at step S807, a black-pixel area surrounding a document prescanned with the document cover open is eliminated. In other words, it becomes possible to detect the document area precisely. Further, since the binary image $\text{Img}_{bw}$ generated at step S806 with respect to the prescan image obtained with the document cover closed captures solely the document area, it becomes possible to detect the document area precisely. In other words, it can be understood that by successively executing the processing for detecting the first document area and the processing for detecting the second document area, highly precise detection of the document area can be achieved regardless of whether the document cover is open or closed.

Thus, as described above, highly precise detection of the document area can be achieved by executing image processing by the image processing apparatus according to the first embodiment. Furthermore, there is no need for a special sensor to sense whether the document cover is open or closed. Further, it is not required that the operator be aware of the open/closed state of the document cover. Further, the fact that the apparatus is constructed so as to execute main scanning based upon the second document area decided by the above-described document-area decision processing is ideal.

(Modification)

FIGS. 9A and 9B are diagrams exemplifying the results of extracting a document area from a prescan image based upon the second document area. Usually, in a case where the document is one having thickness, such as a book, it is difficult to place the document on the contact glass in such a manner that the document will not shift. Consequently, there are instances where the edge of the document on the side opposite the document-abutment position is deformed into a V-shaped form, as illustrated by the prescan image shown in FIG. 4. In this case, there are instances where a portion of the black area surrounding the document remains within the extracted document area, as illustrated in FIG. 9A. Further, there are occasions where the density of the black area produced around the document is non-uniform, depending upon the extent of closure of the document cover. In this case, the document may be detected to be larger than the true document size, which can result from a decline in density near the edge of the document, and a portion of the black area surrounding the document may remain within the extracted document area, as illustrated in FIG. 9B.

Described next will be processing for removing a black-pixel area at the periphery of a document where the above-described phenomenon has occurred.

Figure 10:
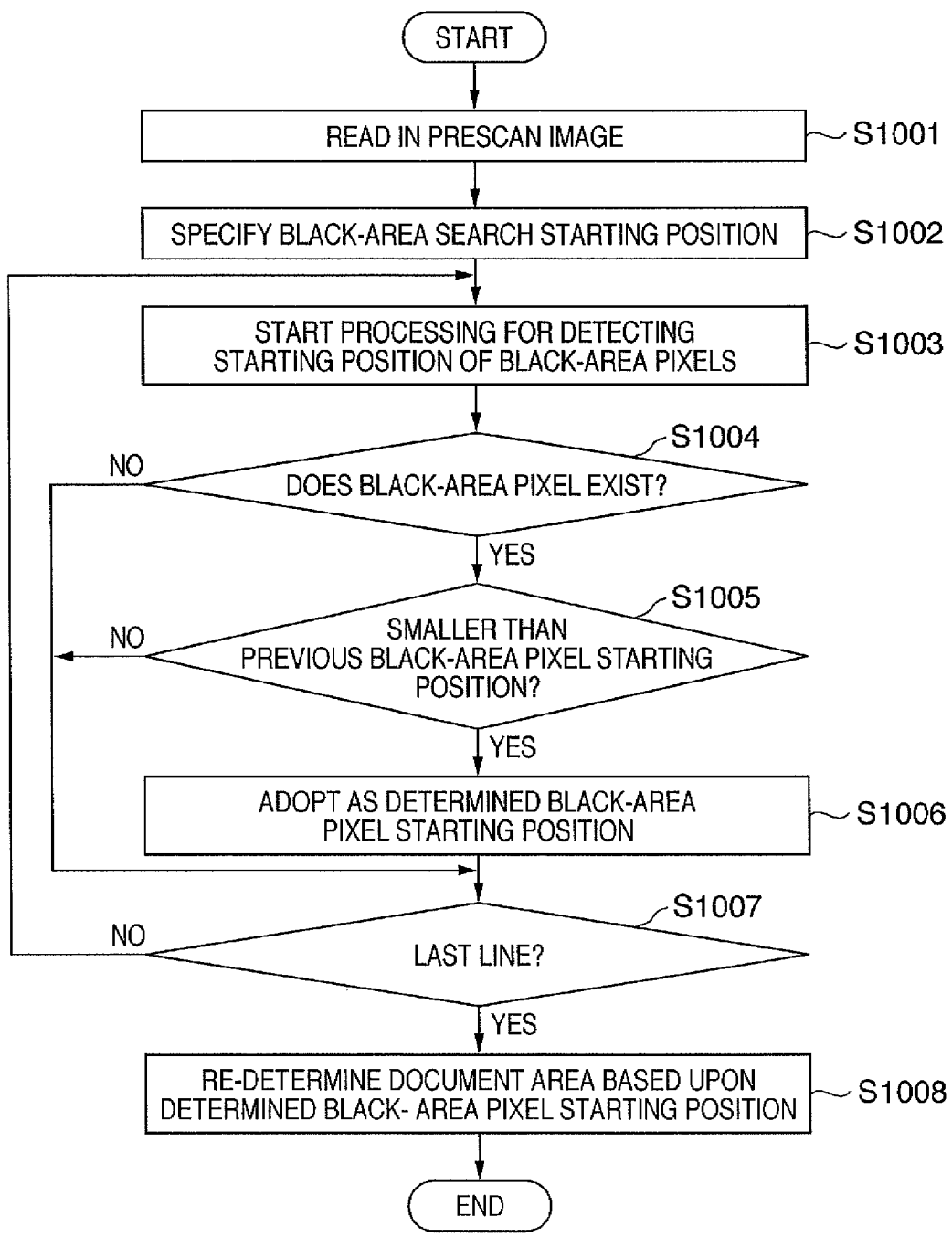
FIG. 10 is a flowchart of operation executed when removing a residual black-pixel area.

FIG. 10 is a flowchart of operation executed when removing a residual black-pixel area. The processing of this flowchart is executed following step S809, by way of example. Alternatively, the processing is executed with regard to a main-scan image generated based upon the second document area decided by step S809 (FIG. 12).

At step S1001 in FIG. 10, the prescan image or main-scan image regarding the second document area is read from the storage unit 107. Processing from this point onward will be based upon the prescan image.

At step S1002, a black-area search starting position for detecting the starting position of black-area pixels line by line is specified with regard to the prescan image read at step S1001. For example, the prescan image is displayed on the display unit 105 and the starting position is accepted from the user via the control panel 102. It should be noted that if the document has been abutted against the document-abutment position, a black area will exist at the rearward end of the lines in the main-scan direction of the image data.

At step S1003, an edge detection filter is utilized from the search starting position specified at step S1002, and the edge position that appears first is detected as the line-by-line black-area starting position. It should be noted that instead of using an edge detection filter, a fixed number of successive black pixels may be detected using a threshold value of color difference or a threshold value of brightness values, and the position of the pixel at the beginning of these successive pixels is adopted as the black-area starting position.

At step S1004, it is determined whether the black-area starting position has been detected. If the black-area starting position could not be detected, then control proceeds to step S1007. If the black-area starting position has been detected, however, then control proceeds to step S1005.

At step S1005, a comparison is made with the black-area starting position detected previously. If the presently detected position is on the side at the beginning of the line, then this position is adopted as the black-area starting position (step S1006). If the presently detected position is more toward the rear of the line in comparison with the black-area starting position detected previously, then control proceeds to step S1007.

By repeating the above-described processing up to the last line ("YES" at step S1007), then the black-area starting position that exists at the foremost head of the line is finally decided upon as the black-area starting position of the document area (step S1008).

Figure 11A:
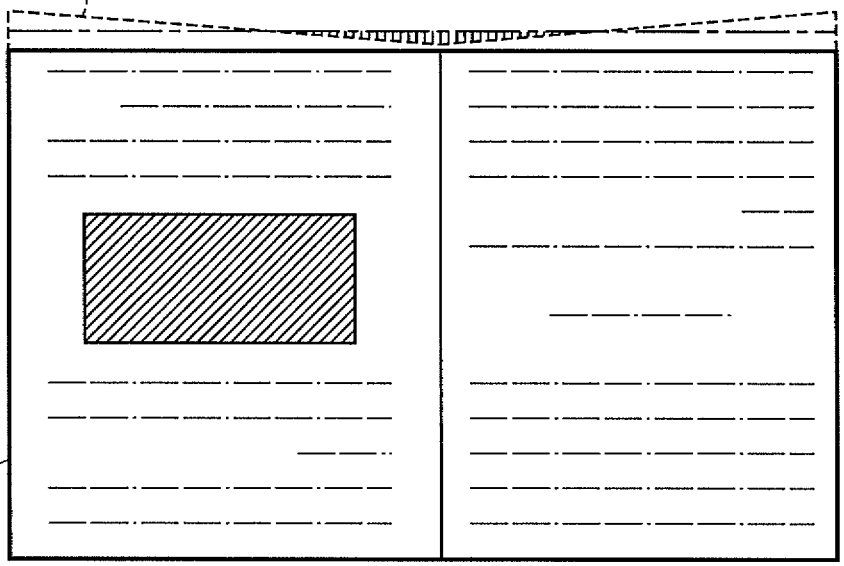
FIGS. 11A and 11B are diagrams exemplifying results obtained by subjecting the extracted results of FIGS. 9A and 9B to area re-determination processing and converting the results to print data.
Figure 11B:
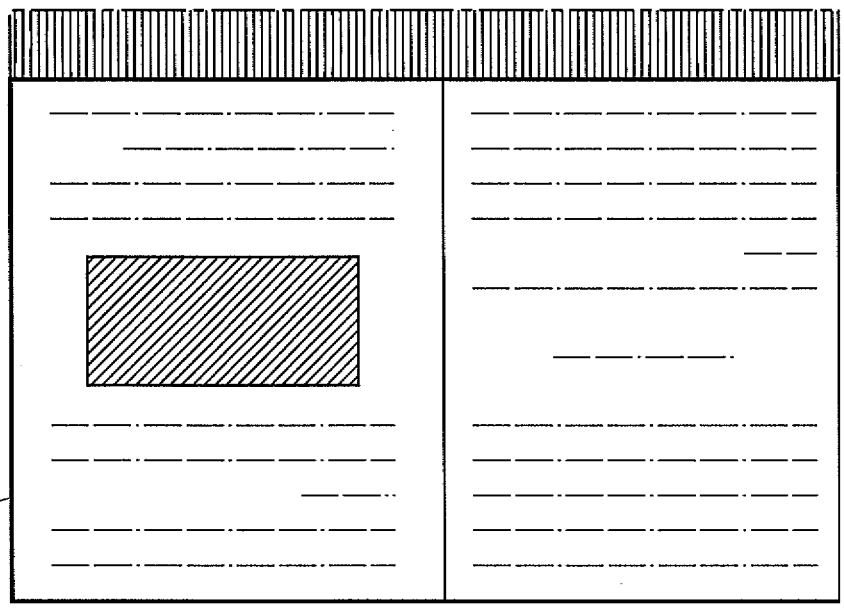

FIGS. 11A and 11B are diagrams exemplifying results obtained by subjecting the extracted results of FIGS. 9A and 9B to area re-determination by the above-described processing for again searching for the black area, and converting the results to print data. By reading (by main scanning) the re-determined document area at a resolution best suited to the copy mode and printing the image on the set paper, it is possible to obtain a copy from which the black area surrounding the document has been removed.

In accordance with the image processing apparatus of this modification, as described above, it is possible to further reduce decision error regarding document range dependent upon reading conditions such as a deformed document image or extent of closure of the document cover.

Further, area determination of higher precision can be achieved by executing area re-determination by subjecting an image read at the time of main scanning to the above-described processing for again searching for the black area. In other words, it is possible to reduce error ascribable to a slight difference in document placement condition (position, degree to which the document is pressed, extent of closure of the document cover) between prescanning and main scanning.

(Second Embodiment)

An image processing apparatus having a reading unit will be described as an example of a second embodiment of an image processing apparatus according to the present invention. The structure of the apparatus is similar to that of the first embodiment and need not be described again. The second embodiment differs from the first embodiment in that reading operations, namely prescanning and main scanning operations, are not performed a plurality of times; here area determination is implemented by a single reading operation <Operation of Apparatus>

Figure 13:
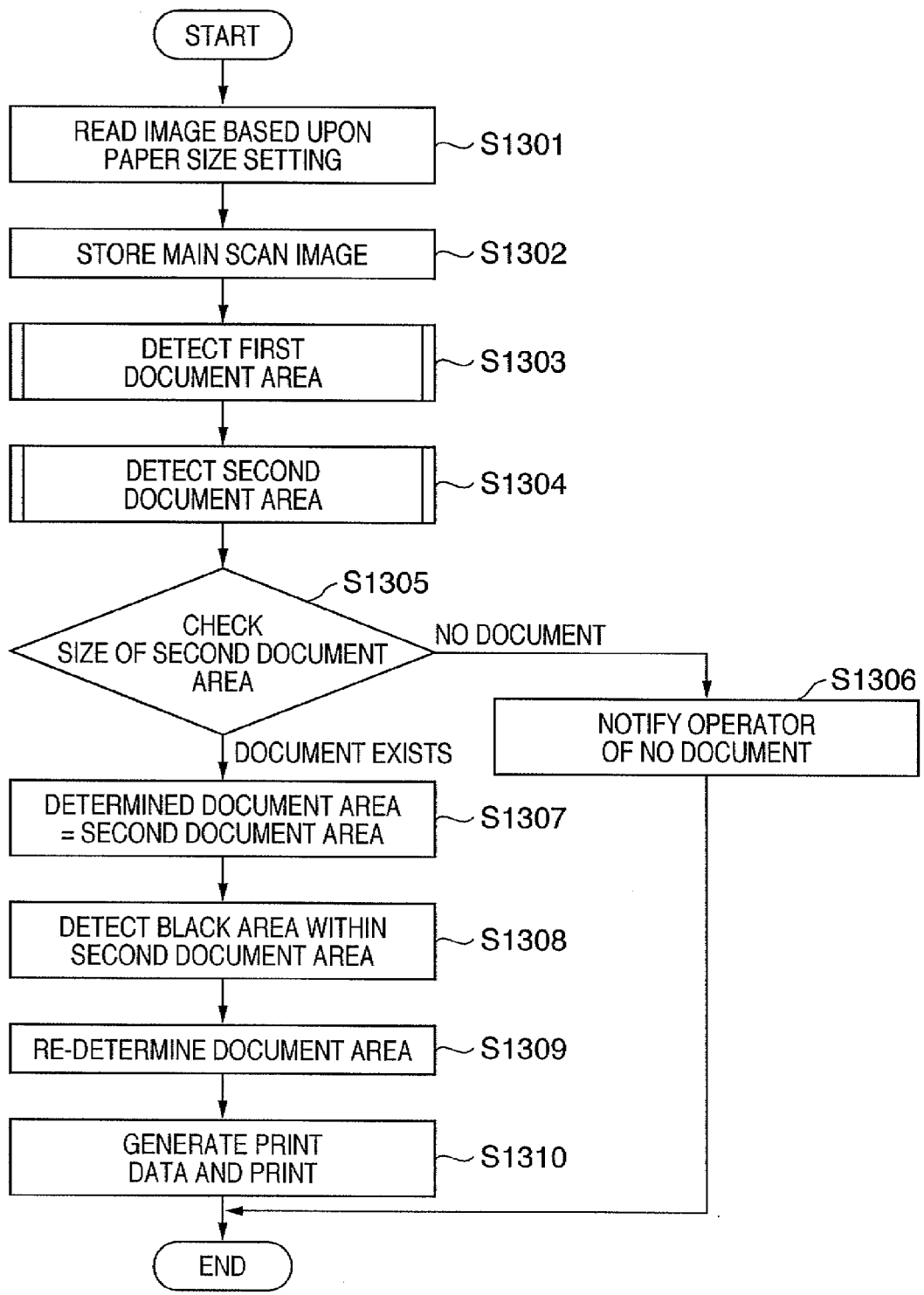
FIG. 13 is a flowchart of document area detection and printing in an image processing apparatus according to a second embodiment of the present invention.

FIG. 13 is a flowchart of processing for detecting a document area in the image processing apparatus according to the first embodiment.

FIG. 13 is a flowchart of document area detection and printing in the image processing apparatus according to the second embodiment.

At step S1301, the document is subjected to main scanning in conformity with the paper size set in the image processing apparatus 100 and the resolution setting, etc.

At step S1302, the image data read at step S1301 is stored in the storage unit 107.

At step S1303, first document area detection processing is applied by the image processor 108 to the image data stored at step S1302, whereby a first document area is decided. The details of first document area detection processing are similar to those described above in conjunction with FIG. 3.

At step S1304, second document area detection processing is applied by the image processor 108 to the image data stored at step S1302, whereby a second document area is decided. The details of second document area detection processing are similar to those described above in conjunction with FIG. 8.

At step S1305, the size of the second document area decided at step S1304 is checked by the image processor 108. If the size of the second document area is a minimum-detected document size stipulated beforehand for this image processing apparatus, i.e., less than 1 inch×1 inch, the decision rendered is absence of a document and control proceeds to step S1306. On the other hand, if the size of the second document area is larger than the second document area is a minimum-detected document size stipulated beforehand for this image processing apparatus, control proceeds to step S1307.

At step S1306, absence of a document is displayed by the display unit 105 and processing is exited without executing the generation and printing of print data. This makes it possible to suppress the execution of needless printing.

At step S1307, an area corresponding to the second document area of the main-scan image data is set as the document area and the data of this area is extracted.

At step S1308, the starting position of black-area pixels is detected line by line in the document area extracted at step S1307. Since the document usually is abutted against the document-abutment position, a black area will exist at the rearward end of the lines in the main-scan direction of the image data. The black-area search starting position is specified in order to eliminate needless processing. An edge detection filter is utilized from the specified search starting position and the edge position that appears first is detected as the line-by-line black-area starting position. A comparison is made with the detected black-area starting position of each line and the position at the foremost head of the line is decided upon as the black-area starting position. Then, at step S1309, area re-determination is carried out. This processing is substantially similar to that of FIG. 10.

At step S1310, image data regarding the area re-determined at step S1309 is extracted and converted to print data, and the print data is stored in a print buffer. The print data stored in the print buffer is then printed on the set paper.

In accordance with the image processing apparatus according to the second embodiment, as described above, it is possible to output a copy from which a black area surrounding a document has been removed with greater precision.

(Other Embodiments)

Although embodiments of the present invention have been described above, the present invention may be applied to a system constituted by a plurality of devices (e.g., a host computer, interface, reader, printer, etc.) or to an apparatus comprising a single device (e.g., a copier or facsimile machine, etc.).

Furthermore, the object of the invention is attained also by supplying a program, which implements the functions of the foregoing embodiments, directly or remotely to a system or apparatus, reading the supplied program codes by the system or apparatus, and then executing the program codes. Accordingly, since the functional processing of the present invention is implemented by computer, the computer program per se installed on the computer falls within the technical scope of the present invention.

In this case, so long as the system or apparatus has the functions of the program, the form of the program, e.g., object code, a program executed by an interpreter or script data supplied to an operating system, etc., does not matter.

Examples of recording media that can be used for supplying the program are a floppy (registered trademark) disk, hard disk, optical disk (CD, DVD), magneto-optical disk, magnetic tape, non-volatile type memory card and ROM, etc.

As for the method of supplying program, it may be supplied by making a connection to a website on the Internet using the browser of a client computer. At this time the computer program per se of the present invention or an automatically installable compressed file of the program can be supplied by downloading it to a recording medium such as a hard disk. Further, this can be implemented by dividing the program code constituting the program of the present invention into a plurality of files and downloading the files from different websites. In other words, a WWW (World Wide Web) server that downloads, to multiple users, the program for implementing the functional processing of the present invention by computer also is covered by the claims of the present invention.

Further, the program of the present invention is encrypted, stored on a storage medium such as a CD-ROM and distributed to users. Users who meet certain requirements are allowed to download decryption key information from a website via the Internet. It is possible to run the encrypted program upon decrypting it using the key information, whereby the program is installed in the computer.

Further, the functions of the above-described embodiments are implemented by having a computer execute a program that has been read. In addition, an operating system or the like running on the computer may perform all or a part of the actual processing based upon the instructions of the program so that the functions of the foregoing embodiments can be implemented by this processing.

Furthermore, a program that has been read from a recording medium may be written to a memory provided on a function expansion board inserted into the computer or provided in a function expansion unit connected to the computer. A CPU or the like provided on the function expansion board or in the function expansion unit then performs a part of or all of the actual processing based upon the instructions of the program codes and implements the functions of the above embodiments by such processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-333867, filed Dec. 11, 2006, which is hereby incorporated by reference herein in its entirety.

What is claimed is:

1. An image processing apparatus comprising:
   a reading unit for reading a document, which has been placed on a contact glass, as read image data formed by RGB color components;
   a first area determination unit for deciding a provisional document area by subjecting the read image data, which has been read by said reading unit, to first detection processing for detecting a document area included in the read image data based upon a brightness value of each pixel constituting the read image data; and
   a second area determination unit for deciding a fixed document area based on both an area defined by binary image data and the provisional document area,
   wherein said second area determination unit determines whether the following i), ii) and iii) requirements are satisfied for each pixel of the read image, and generates the binary image data by setting a value for each pixel to one if at least one of the following i), ii) and iii) requirements is satisfied and to zero otherwise:
   i) the brightness value of grayscale image data which is converted from the read image data does not exceed a given threshold,
   ii) the difference between the maximum and minimum RGB color components of each pixel constituting the read image data is not less than a given threshold, and
   iii) the pixel of the grayscale image data which is converted from the read image data is part of an edge which is determined by using an edge detection filter.

2. The apparatus according to claim 1, further comprising a generating unit for extracting an area, which corresponds to the fixed document area, from the read image data, and generating this area as document image data.

3. The apparatus according to claim 1, wherein
   said reading unit generates the read image data by successively reading the document in a first direction, which is a main-scan direction, and in a second direction, which is a sub-scan direction that forms a right angle with the first direction, with a document-placement reference point provided on the contact glass serving as a reference, and
   said first area determination unit executes edge detection processing for detecting a position of an edge of the document area in the main- and sub-scan directions of the read image data, and decides the provisional document area based upon the most frequently detected document edge position in the main- and sub-scan directions, respectively.

4. The apparatus according to claim 1, wherein said second area determination unit comprises a noise removing unit for removing noise from the binary image, and decides the fixed document area based upon the binary image from which noise has been removed.

5. An image processing method comprising:
   reading a document, which has been placed on a contact glass, as read image data formed by RGB color components;
   making a first area determination, of deciding a provisional document area by subjecting the read image data, which has been read in said reading step, to first detection processing for detecting a document area included in the read image data based upon a brightness value of each pixel constituting the read image data; and
   making a second area determination, of deciding a fixed document area based on both an area defined by binary image data and the provisional document area,
   wherein the second area determination includes determining whether the following i), ii) and iii) requirements are satisfied for each pixel of the read image, and generating the binary image data by setting a value for each pixel to one if at least one of the following i), ii) and iii) requirements is satisfied and to zero otherwise:
   i) the brightness value of grayscale image data which is converted from the read image data does not exceed a given threshold,
   ii) the difference between the maximum and minimum RGB color components of each pixel constituting the read image data is not less than a given threshold, and
   iii) the pixel of the grayscale image data which is converted from the read image data is part of an edge which is determined by using an edge detection filter.

6. The method according to claim 5, further comprising extracting an area, which corresponds to the fixed document area, from the read image data, and generating this area as document image data.

7. The method according to claim 5, wherein
   said reading includes generating the read image data by successively reading the document in a first direction, which is a main-scan direction, and in a second direction, which is a sub-scan direction that forms a right angle with the first direction, with a document-placement reference point provided on the contact glass serving as a reference, and
   said first area determination includes executing edge detection processing for detecting a position of an edge of the document area in the main- and sub-scan directions of the read image data, and deciding the provisional document area based upon the most frequently detected document edge position in the main- and sub-scan directions, respectively.

8. The method according to claim 5, wherein said second area determination includes removing noise from the binary image, and deciding the fixed document area based upon the binary image from which noise has been removed.

* * * * *